US011220333B2

United States Patent
Min et al.

(10) Patent No.: US 11,220,333 B2
(45) Date of Patent: Jan. 11, 2022

(54) TILTING TYPE ROTOR

(71) Applicant: SAMCO CO., LTD, Sacheon-si (KR)

(72) Inventors: Kyoungmoo Min, Jinju-si (KR); Sehoon Jang, Jinju-si (KR); Bhattarai Nikesh, Sacheon-si (KR); Foongyi Chia, Sacheon-si (KR)

(73) Assignee: SAMCO CO., LTD, Sacheon-si (KR)

( * ) Notice: Subject to any disclaimer, the term of this patent is extended or adjusted under 35 U.S.C. 154(b) by 103 days.

(21) Appl. No.: 16/474,356

(22) PCT Filed: Jan. 4, 2017

(86) PCT No.: PCT/KR2017/000085
§ 371 (c)(1),
(2) Date: Jun. 27, 2019

(87) PCT Pub. No.: WO2018/124353
PCT Pub. Date: Jul. 5, 2018

(65) Prior Publication Data
US 2019/0337615 A1 Nov. 7, 2019

(30) Foreign Application Priority Data

Dec. 30, 2016 (KR) .......................... 10-2016-0183488

(51) Int. Cl.
*B64C 29/00* (2006.01)
*B64C 27/52* (2006.01)
(52) U.S. Cl.
CPC .......... *B64C 29/0033* (2013.01); *B64C 27/52* (2013.01)

(58) Field of Classification Search
CPC ......... B64C 27/28; B64C 27/43; B64C 27/52; B64C 29/033; Y10T 16/544; E05D 15/408; E05D 15/42; E05D 15/44
See application file for complete search history.

(56) References Cited

U.S. PATENT DOCUMENTS 6,260,793 B1 7/2001 Balayn et al.
6,367,736 B1 4/2002 Pancotti
(Continued)

FOREIGN PATENT DOCUMENTS

GB         437447 A * 10/1935 ......... B64C 29/0033
KR   10-0555176 B1    3/2006
(Continued)

OTHER PUBLICATIONS

International Search Report for PCT/KR2017/000085 dated Aug. 31, 2017 from Korean Intellectual Property Office.

*Primary Examiner* — Christopher Verdier
*Assistant Examiner* — Elton K Wong
(74) *Attorney, Agent, or Firm* — Revolution IP, PLLC

(57) ABSTRACT

Disclosed is a tilting type rotor including: a body part in which a longitudinal direction is formed at both sides, a receiving space is provided therein, and a sliding hole having a through-hole shape is provided in the longitudinal direction at inner lower portions of both end portions; a servo part formed at the center of the body part and having a rotational shaft vertical to the longitudinal direction of the body part; a tilting part tilted in a manner in which the other end portion is rotated as one end portion is connected to both end portions of the body part; a rotor part provided to generate thrust and connected to the tilting part; and a link part connected to the servo part and connected to the tilting part.

4 Claims, 5 Drawing Sheets

(56) References Cited

U.S. PATENT DOCUMENTS

| | | | | |
|---|---|---|---|---|
| 6,655,631 | B2* | 12/2003 | Austen-Brown | B64D 25/00 244/12.4 |
| 2010/0236021 | A1* | 9/2010 | Sir Louis | E05F 3/18 16/303 |
| 2014/0034029 | A1* | 2/2014 | Sasaki | F02M 26/54 123/568.26 |
| 2016/0229531 | A1 | 8/2016 | Robertson et al. | |
| 2018/0141655 | A1* | 5/2018 | Wall | B64C 29/0033 |

FOREIGN PATENT DOCUMENTS

| | | |
|---|---|---|
| KR | 10-2013-0077242 A | 7/2013 |
| KR | 10-1654544 B1 | 9/2016 |

\* cited by examiner

TILTING TYPE ROTOR

CROSS-REFERENCE TO PRIOR APPLICATIONS

This application is a National Stage Patent Application of PCT International Patent Application No. PCT/KR2017/000085 filed on Jan. 4, 2017 under 35 U.S.C. § 371, which claims priority to Korean Patent Application No. 10-2016-0183488 filed on Dec. 30, 2016, which are all hereby incorporated by reference in their entirety.

BACKGROUND

The present invention relates to a tilting type rotor and more particularly, to a rotor capable of tilting rotors formed in both directions so as to generate a propelling force in the same direction and preventing a tilting angle from being changed by an external force.

In general, a tilting type rotor configured to serve both as a vertical takeoff and landing of an aircraft can be configured to be capable of tilting only in one direction or a tilting system is configured for each rotor individually, thereby increasing the weight of the aircraft and decreasing efficiency and defects such as a change in the angle of the tilted rotor due to an external pressure are frequently generated.

In this regard, referring to the related art, 'CONVERTIBLE TILTROTOR AIRCRAFT' is disclosed in U.S. Patent Application Publication No. US2016/0229531, which is applicable only to a single rotor entity, and has no configuration in which the tilted rotor easily responds to the external pressure, and as a result, there is a problem that it is difficult to apply to a substantial tilting rotor configuration.

PRIOR ART DOCUMENT

Patent Document (Patent Document 1) US Patent Application Publication No. 2016/0229531 (Aug. 11, 2016)

SUMMARY

Accordingly, the present invention is contrived to solve the problem in the related art and an object of the present invention is to provide a tilting type rotor capable of simultaneously tilting a bi-directional rotor.

Further, another object of the present invention is to provide a tilting type rotor with a structure capable of preventing a tilted rotor from being rotated by an external pressure.

Objects to be solved by the present invention are not limited to the aforementioned objects and other unmentioned objects to be solved by the present invention will be clearly understood by those skilled in the art from the following description.

The tilting type rotor according to the present invention is configured to include: a body part in which a longitudinal direction is formed at both sides, a receiving space is provided therein, and a sliding hole having a through-hole shape is provided in the longitudinal direction at inner lower portions of both end portions; a servo part formed at the center of the body part and having a rotational shaft vertical to the longitudinal direction of the body part; a tilting part tilted in a manner in which the other end portion is rotated as one end portion is connected to both end portions of the body part; a rotor part provided to generate thrust and connected to the tilting part; and a link part connected to the servo part and connected to the tilting part.

The tilting type rotor according to the present invention can perform vertical takeoff and landing by effectively tilting a plurality of rotors with a minimum structure at the same time.

Further, the tilting type rotor according to the present invention can stably fix the tilted rotor so that the angle is not changed by external pressure.

Figure 2:
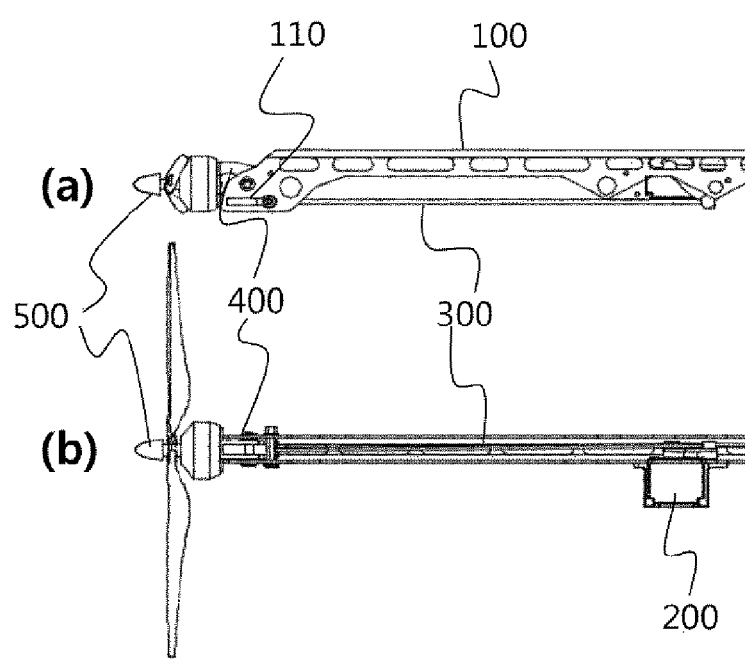

(a) of FIG. 2 is a side view of the tilting type rotor according to the present invention, in which a rotational shaft of the rotor part is vertical to the ground.

(b) of FIG. 2 is a bottom view of the tilting type rotor according to the present invention, in which the rotational shaft of the rotor part is vertical to the ground.

Figure 3:
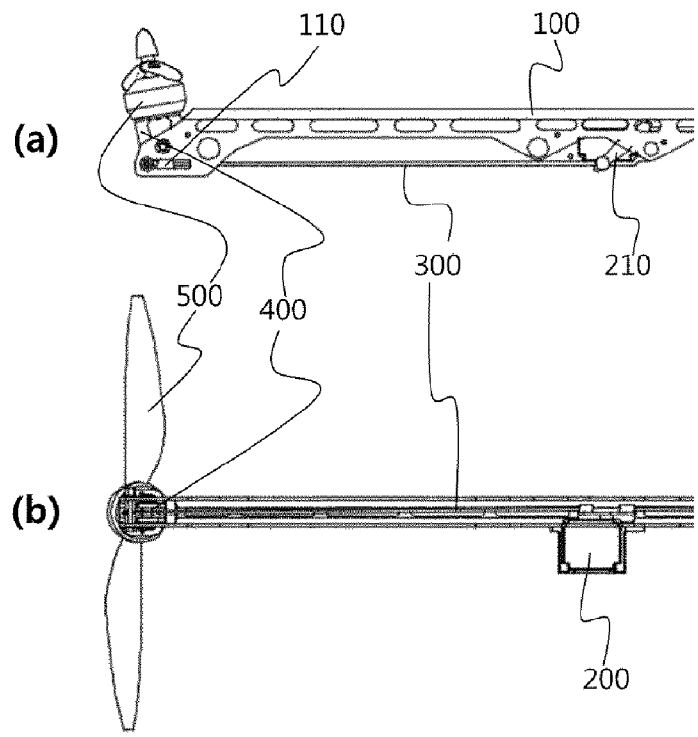

(a) of FIG. 3 is a side view of the tilting type rotor according to the present invention, in which a rotational shaft of the rotor part is vertical to the ground.

(b) of FIG. 3 is a bottom view of the tilting type rotor according to the present invention, in which the rotational shaft of the rotor part is vertical to the ground.

Figure 4:
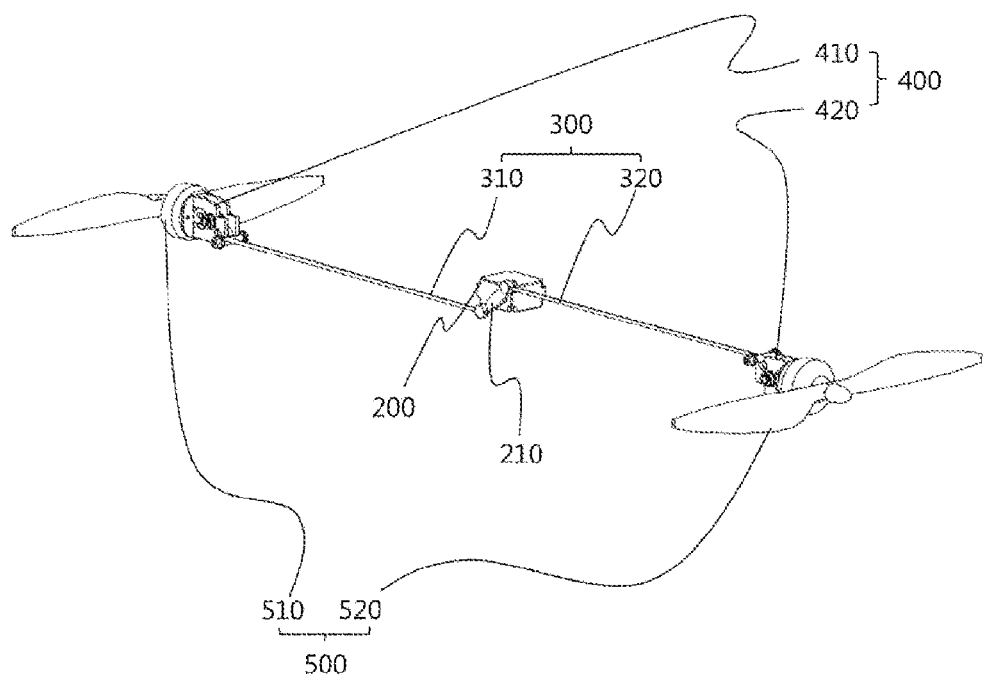

FIG. 4 illustrates an embodiment in which the rotor part, the titling part, and the link part are configured at both sides in the tilting type rotor according to the present invention.

Figure 5:
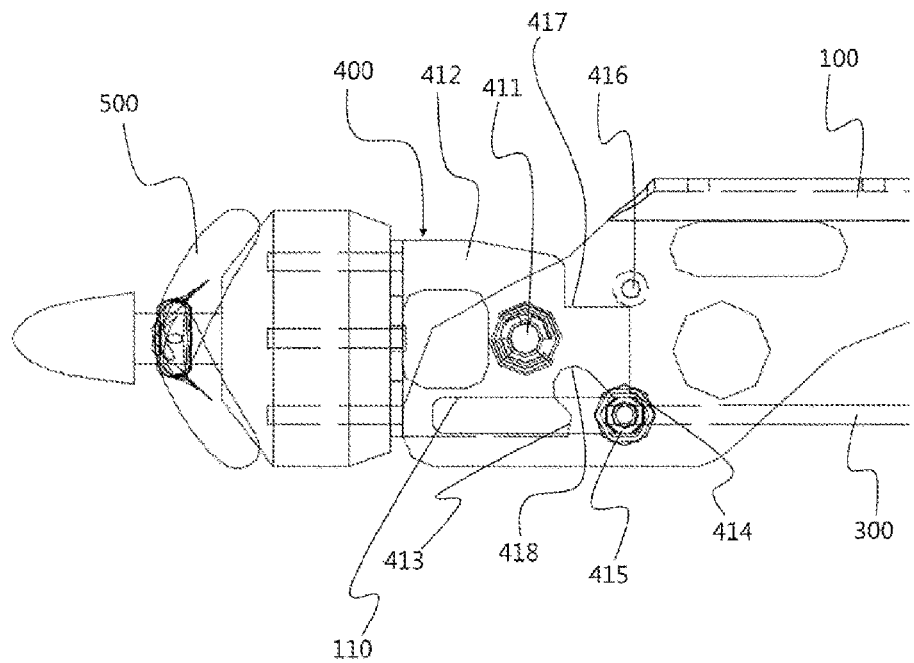

FIG. 5 illustrates a configuration of the tilting part when the rotational shaft of the rotor part is parallel to the ground in the tilting type rotor according to the present invention.

Figure 6:
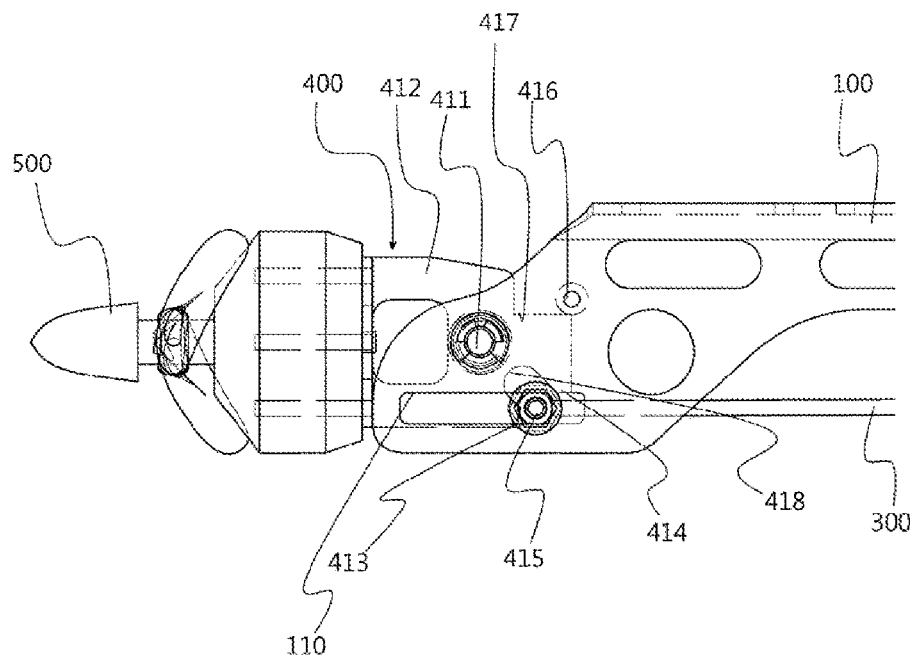

FIG. 6 illustrates a configuration of the tilting part in a process of moving a sliding pin in the tilting type rotor according to the present invention.

Figure 7:
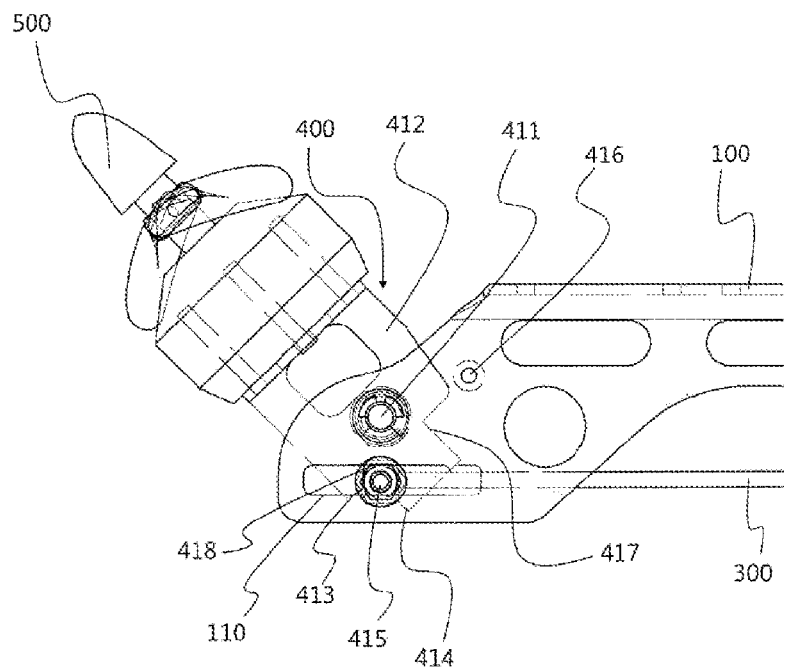

FIG. 7 illustrates a configuration of the tilting part in a process of moving a sliding pin in the tilting type rotor according to the present invention.

Figure 8:
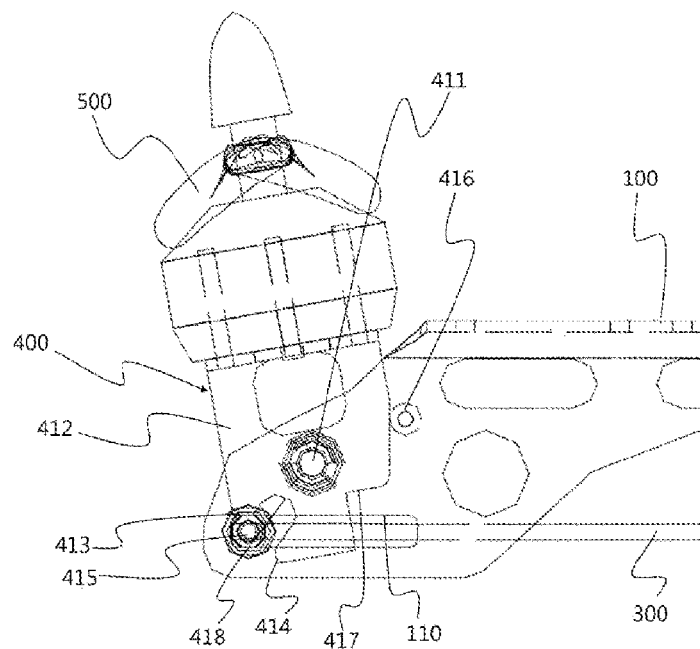

FIG. 8 illustrates a configuration of the tilting part when the rotational shaft of the rotor part is vertical to the ground in the tilting type rotor according to the present invention.

Figure 9:
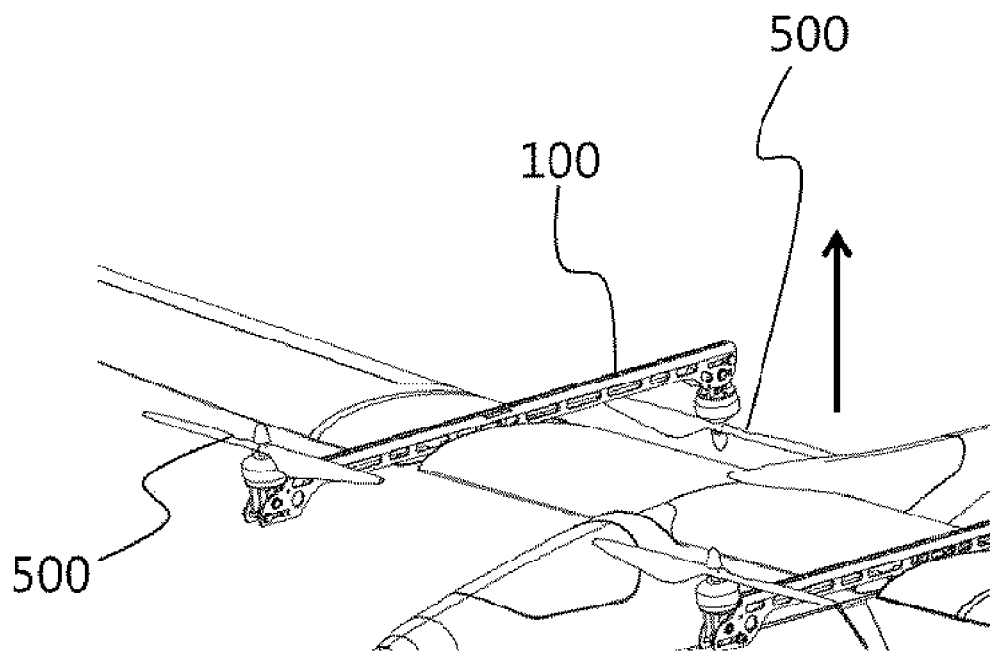

FIG. 9 illustrates an example in which the tilting part is applied to an airplane airframe according to the present invention.

Figure 10:
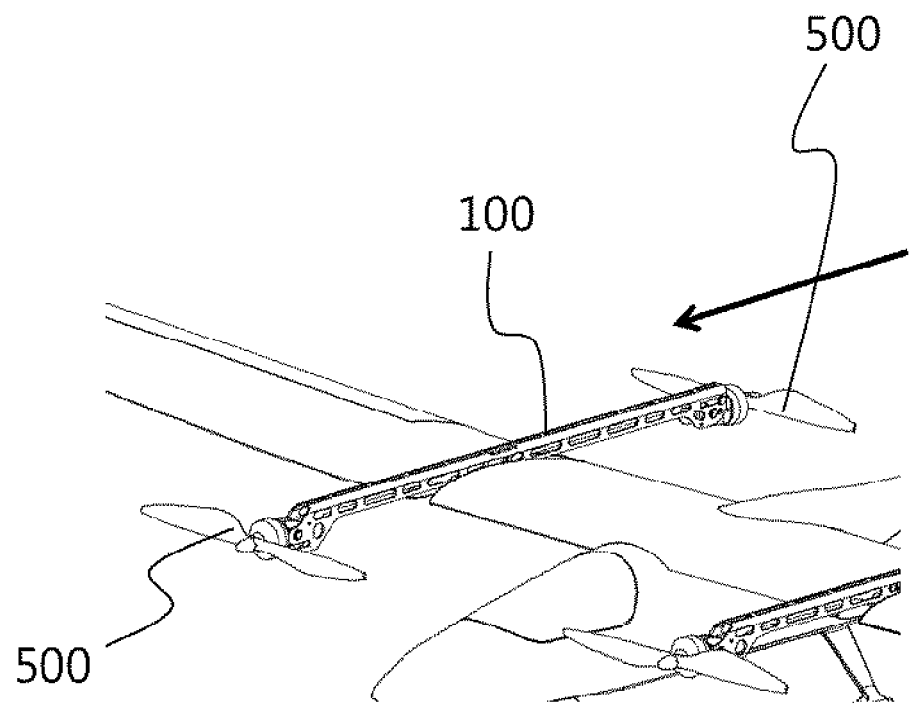

FIG. 10 illustrates an example in which the tilting part is applied to an airplane airframe according to the present invention.

DETAILED DESCRIPTION

Specific matters including problems to be solved for the present invention, a solving means of the problems, and the effect of the invention for the present invention are included in embodiments and drawings to be described below. Advantages and features of the present disclosure, and methods for accomplishing the same will be more clearly understood from embodiments described in detail below with reference to the accompanying drawings.

A tilting type rotor according to the present invention is configured to include a body part 100 in which a longitudinal direction is formed at both sides, a receiving space is provided therein, and a sliding hole 110 having a through-hole shape is provided in the longitudinal direction at inner lower portions of both end portions, a servo part 200 formed at the center of the body part 100 and having a rotational shaft vertical to the longitudinal direction of the body part 100, a tilting part 400 tilted in a manner in which the other end portion is rotated as one end portion is connected to both end portions of the body part 100, a rotor part 500 provided to generate thrust and connected to the tilting part 400, and a link part 300 connected to the servo part 200 and extended to both sides, and connected to the tilting part 400.

First, the body part 100 is formed in the longitudinal direction at both sides, has a receiving space therein, and has a sliding hole 110 having a through-hole shape in the longitudinal direction at inner lower portions of both end portions.

Figure 1:
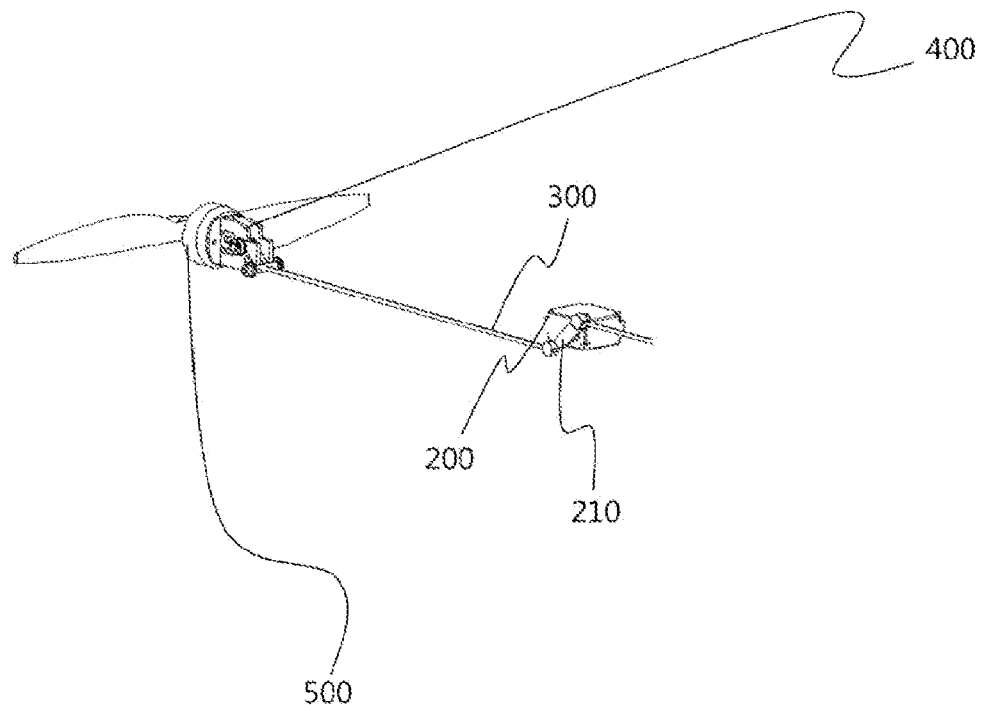
FIG. 1 is a view illustrating a connection structure of a servo part, a link part, a tilting part and a rotor part of a tilting type rotor according to the present invention.

FIG. 1 illustrates a combined configuration of a lower part 500, a link part 300, a servo part 200, and a tilting part 400 below except for the body part 100 and FIGS. 2 and 3 illustrate configurations of the rotor part 500, the link part 300, the servo part 200, and the tilting part 400, which are combined with the body part 100.

The body part 100 as a base part for easily mounting and fixing the rotor part 500, the link part 300, the servo part 200, and the tilting part 400 described below is preferably configured by a structure made of a material having excellent rigidity.

In this case, the sliding hole 110 having the through-hole shape, which penetrates in a lateral direction is further provided at the inner lower portion of each of both end portions of the body part 100.

The sliding hole 110 is a portion which is inserted with a sliding pin and slid and the sliding pin is slid in the sliding hole 110, and as a result, the tilting part 400 is tilted. This is mentioned below in more detail.

Next, the servo part 200 is formed at the center of the body part 100 and is parallel to the ground and has a rotational shaft vertical to the longitudinal direction of the body part 100.

The servo part 200 is a power source for providing driving force to drive the tilting part 400, and the link part 300 moves to inner and outer directions of the body part 100 and the tilting part 400 connected to the link part 300 is rotated around a hinge shaft portion 411, by driving of the servo part 200.

In this case, a link control portion 210 having a short bar shape is further provided on the rotational shaft of the servo part 200 as illustrated in FIG. 1.

The center of the link control portion 210 is connected to the rotational shaft of the servo part 200 and each end portion is connected to the link part 300 and the link control portion 210 is rotated by rotation of the servo part 200 to move the link part 300.

The link part 300 may move in the longitudinal direction of the body part by the link control portion 210.

As illustrated in FIG. 4, when the tilting part and the rotor part are optionally formed at both ends of the body part, the link parts are also provided at both ends, and as a result, the first link portion 310 is connected to one end portion of the link control portion 210 and the second link portion 320 is connected to the other end portion of the link control portion 210. The link control portion 210 is rotated by rotation of the servo part 200, and as a result, the first link portion 310 and the second link portion 320 simultaneously move to the inside of the body part 100 or in the outer direction of the body part 100.

In this case, the length of the link control portion 210 is preferably formed to be equal to or slightly longer than that of the sliding hole 110.

As a result, the link part 300 may be repeatedly rotated only by the length of the sliding hole 110.

Next, the tilting part 400 is provided to be tilted in such a manner that one end portion is connected to the end portion of the body part 100 and the other end portion is rotated.

The rotor part 500 is tightly coupled to the other end portion of the tilting part 400.

Specifically, the tiling part 400 is constituted by a hinge shaft portion 411, a tilting body portion 412, a first control portion 413, a second control portion 414, a sliding pin portion 415, a stop pin portion 416, a stop edge, and a clearance groove 418.

FIGS. 5 to 7 specifically illustrate a configuration of the tilting part 400.

First, the hinge shaft portion 411 is provided in a pin shape in which the hinge shaft portion 411 horizontally penetrates the end portion of the body part 100.

The hinge shaft portion 411 as a portion which becomes a shaft for rotation of the tilting part 400 penetrates an inner side of the end portion of the body part 100 in a lateral direction vertical to the longitudinal direction of the body part 100.

Next, the center of the tilting body portion 412 is penetratively connected to the hinge shaft portion 411 to be rotated around the hinge shaft portion 411 and the other end portion may be connected to the servo part 200.

Next, the first control portion 413 is provided in an edge shape at the lower portion of one end portion of the tilting body portion 412.

Next, the second control portion 414 is projected on the other end portion of the tilting body portion 412 and provided in the shape of a downward facing edge.

Further, the clearance groove 418 having a groove inside thereof is provided between the first control portion 413 and the second control portion 414.

Further, a stop edge portion 417 having a shape in which an edge is recessed inside thereof is provided at an upper portion of one end portion of the tilting body portion 412.

Next, the sliding pin portion 415 is provided in a pin shape which penetrates the sliding hole 110 and provided to apply force to the first control portion 413 and the second control portion 414 while sliding along the sliding hole 110.

Next, the stop pin portion 416 is provided in a pin shape which horizontally penetrates the end portion of the body part 100 to control a rotational radius of the tilting part 400.

In a state in which the rotational shaft of the rotor part 500 is maintained horizontally, as illustrated in FIG. 5, the sliding pin portion 415 is positioned at a rightmost side of the sliding hole 110, and as a result, the second control portion 414 and the sliding pin portion 415 contact each other.

As described above, in a state in which the sliding pin portion 415 and the second control portion 414 contact each other, even though the external pressure is vertically applied to the tilting part 400 and the rotor part 500, the second control portion 414 is supported by the sliding pin portion 415, and as a result, the tilting part 400 and the rotor part 400 are not rotated.

In this case, when the link part 300 moves the sliding pin portion 415 in the outer direction of the body part 100 by driving of the servo part 200, the sliding pin portion 415 contacts the first control portion 413 as illustrated in FIG. 5.

When the sliding pin portion 415 restricting the rotation of the tilting part 400 pushes the first control portion 413, the tilting part 400 is rotated.

When the sliding pin portion 415 persistently pushes the first control portion 413, the tilting part 400 is rotated as illustrated in FIG. 7 and the sliding pin portion 415 is seated on the clearance groove 418 to persistently rotate the tilting part 400.

When the sliding pin portion 415 is completely pushed to rotate the rotational shaft of the rotor part 500 so as to be nearly vertical to the ground, the tilting body portion 412 is not rotated any longer and stopped by the stop edge portion 417.

In this case, the sliding pin portion 415 is configured to support the first control portion 413 as illustrated in FIG. 8 to prevent the tilting part 400 from being rotated in an opposite direction.

In the case of the rotation of the tilting part 400, the tilting parts 400 positioned at both end portions of the body part 100 are simultaneously rotated by rotation of the rotor part 500.

In this case, when the rotational shaft of the rotor part 500 is rotated so as to approach a shape vertical to the ground, the tilting part 400 positioned at one end portion of the body part 100 is rotated upward and the tilting part 400 positioned at the other end portion of the body part 100 is tilted downward.

This is to maintain a state to generate the rotation of the rotor part 500 and effectively change a thrust direction.

Specifically, as illustrated in FIG. 9, a rotor formed at one end portion of the body part 100 faces upward and a rotor formed at the other end portion of the body part 100 faces downward to generate a thrust for raising an airplane in overall and then, the rotor part 500 is tilted as illustrated in FIG. 10 while the rotation of the rotor part 500 is similarly maintained to generate a thrust for making the airplane head for front.

A process in which the tilting part 400 is tilted may be repeated optionally (when the airplane rises, when driving, or when landing) according to an operation condition of the airplane.

Next, the rotor part 500 is provided to generate the thrust and provided to be connected to the tilting part 400.

The rotor part 500 may be formed in any form so as to generate an effective thrust.

Next, the link part 300 is provided to be connected to the servo part 200 to be connected to the tilting part 400.

As described above, those skilled in the art will be able to understand that a technical configuration of the present invention can be easily executed in other detailed forms without changing the technical spirit or an essential feature thereof.

Therefore, the embodiments described as above are exemplary in all aspects and should be understood as not being restrictive and the scope of the present disclosure is represented by claims to be described below rather than the detailed description, and it is to be interpreted that the meaning and scope of the claims and all the changes or modified forms derived from the equivalents thereof come within the scope of the present invention.

The invention claimed is:

1. A tilting type rotor comprising:
a body part which is a hollow extrusion that comprises two tilting parts mounted at both ends of the body part and two sliding slots located beneath where the two tilting parts are mounted, each of the two sliding slots having closed ends at both sides thereof;
a servo part mounted at the center of the said body part having a rotational shaft perpendicular to a longitudinal direction of the body part;
a link part in which one end is connected to the rotational shaft of the servo part and the other end is connected to one of the two tilting parts, so that when the rotational shaft rotates, the link part is configured to move in the longitudinal direction and is configured to push one of the two said tilting parts when the rotational shaft rotates in the direction of one of the two said tilting parts and conversely pulls one of the two said tilting parts when the rotational shaft rotates in the opposite direction of one of the two said tilting parts,
wherein each tilting part has a pivot point, and is configured to be tilted upon being pushed or pulled beneath the pivot point by the link part; and
a rotor part mounted on each of the said tilting part and configured to move with each said tilting part when each said tilting part tilts,
wherein each tilting part comprises:
a tilting body having a hinge at the center of the tilting body and two control portions;
a hinge shaft which is the hinge of the said tilting body that penetrates the tilting body and the body part connecting the tilting body and the body part together at the pivot point allowing the tilting body to rotate around the hinge;
a respective sliding pin which is connected to the link part and configured to slide along a respective sliding slot of the two sliding slots upon being pushed or pulled by the link part, contacting the tilting body when sliding, causing the tilting body to rotate about the hinge; and
a stop pin which is connected to the body part and prevents the tilting body from rotating over a certain angle.

2. The tilting type rotor of claim 1, whereby each respective sliding pin is configured to slide along each respective sliding slot from one slot end to another slot end which causes the tilting body of the respective tilting part to rotate from 0 to 90 degrees, the 0 degrees being the longitudinal direction and the 90 degrees being a latitudinal direction.

3. The tilting type rotor of claim 1, whereby when a respective tilting body of the two tilting parts is rotated in such a way that the rotor is facing a latitudinal direction, the respective sliding pin is contacting a first control portion, and the tilting body is contacting the stop pin, the rotation of the tilting body is restricted; and when the tilting body is rotated in such a way that the rotor is facing the longitudinal direction, the respective sliding pin is contacting a second control portion and the tilting body is contacting the stop pin, the rotation of the tilting body is restricted.

4. The tilting type rotor of claim 1,
wherein the link part is a first link part, the tilting type rotor further including a second link part, each of the first and second link parts connected to one of said two tilting parts so that when the rotational shaft of the servo part rotates, the two tilting parts also rotate in such a way that the two tilting parts face the same direction, either both in the longitudinal direction or both in a latitudinal direction.

* * * * *